(12) United States Patent
Nam et al.

(10) Patent No.: US 11,833,982 B2
(45) Date of Patent: Dec. 5, 2023

(54) VEHICLE HAVING DISPERSION MANAGEMENT TYPE EXTERIOR DECORATION DEVICE

(71) Applicants: HYUNDAI MOTOR COMPANY, Seoul (KR); Kia Corporation, Seoul (KR)

(72) Inventors: Geun-Hyung Nam, Incheon (KR); Eun-Soo Park, Busan (KR); Seung-Mok Lee, Osan-si (KR); Yong-Won Jeong, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 238 days.

(21) Appl. No.: 17/375,204

(22) Filed: Jul. 14, 2021

(65) Prior Publication Data

US 2022/0118919 A1 Apr. 21, 2022

(30) Foreign Application Priority Data

Oct. 16, 2020 (KR) ........................ 10-2020-0134272

(51) Int. Cl.
*B60R 13/04* (2006.01)
*F16B 17/00* (2006.01)

(52) U.S. Cl.
CPC ............ *B60R 13/04* (2013.01); *F16B 17/008* (2013.01)

(58) Field of Classification Search
CPC ... B60R 13/005; B60R 13/04; F16B 23/0007; F16B 23/061; F16B 17/008; B62D 65/02; B62D 65/024; B62D 65/028; B62D 65/16

USPC ....................................................... 296/1.08
See application file for complete search history.

(56) References Cited

U.S. PATENT DOCUMENTS

| | | | | |
|---|---|---|---|---|
| 4,408,936 A | * | 10/1983 | Williamson | .......... F16B 39/026 411/3 |
| 7,789,456 B2 | * | 9/2010 | Binder | .................... B60R 13/04 296/191 |
| 2003/0094835 A1 | * | 5/2003 | Yoshida | .................. B60R 13/04 296/209 |
| 2004/0262932 A1 | * | 12/2004 | Abe | ........................ B60R 13/00 296/1.08 |

(Continued)

FOREIGN PATENT DOCUMENTS

| | | | | |
|---|---|---|---|---|
| JP | 2012111358 | * | 6/2012 | ............. B60R 13/04 |
| KR | 10-2019-0033787 A | | 4/2019 | |

*Primary Examiner* — Gregory A Blankenship
(74) *Attorney, Agent, or Firm* — LEMPIA SUMMERFIELD KATZ LLC

(57) ABSTRACT

An exterior decoration device includes: a garnish frame including an upper surface and a reaction force hook protruding inclinedly from a rim portion of the garnish frame and configured to be elastically deformed; a level difference adjustment bolt configured to form a dispersion adjustment structure in a state of being coupled to the garnish frame, protruding in a direction opposite to the garnish exposure member, and configured to adjust both a surface level difference of the garnish exposure member and a hook level difference of the reaction force hook by inducing a rotation of the dispersion adjustment structure and changing a protrusion length from the garnish frame; and a fastening tool configured to define an excessive torque cut-off structure together with the level difference adjustment bolt.

20 Claims, 7 Drawing Sheets

(56) References Cited

U.S. PATENT DOCUMENTS

| | | | |
|---|---|---|---|
| 2009/0045651 A1* | 2/2009 | Binder | B60R 13/04 |
| | | | 49/502 |
| 2013/0214915 A1* | 8/2013 | Nikol | B60Q 9/00 |
| | | | 340/425.5 |
| 2013/0280004 A1* | 10/2013 | Kim | F16B 31/021 |
| | | | 411/2 |
| 2017/0002477 A1* | 1/2017 | Yoshizawa | C25D 3/30 |
| 2019/0075709 A1* | 3/2019 | Reese | A01B 59/062 |
| 2019/0128304 A1* | 5/2019 | Vazquez Baca | B60R 13/0206 |
| 2020/0108489 A1* | 4/2020 | Trygubova | F16B 23/0069 |
| 2022/0348151 A1* | 11/2022 | Peterson | B60R 13/04 |
| 2023/0055806 A1* | 2/2023 | Woo | B62D 24/00 |

\* cited by examiner

FIG. 1
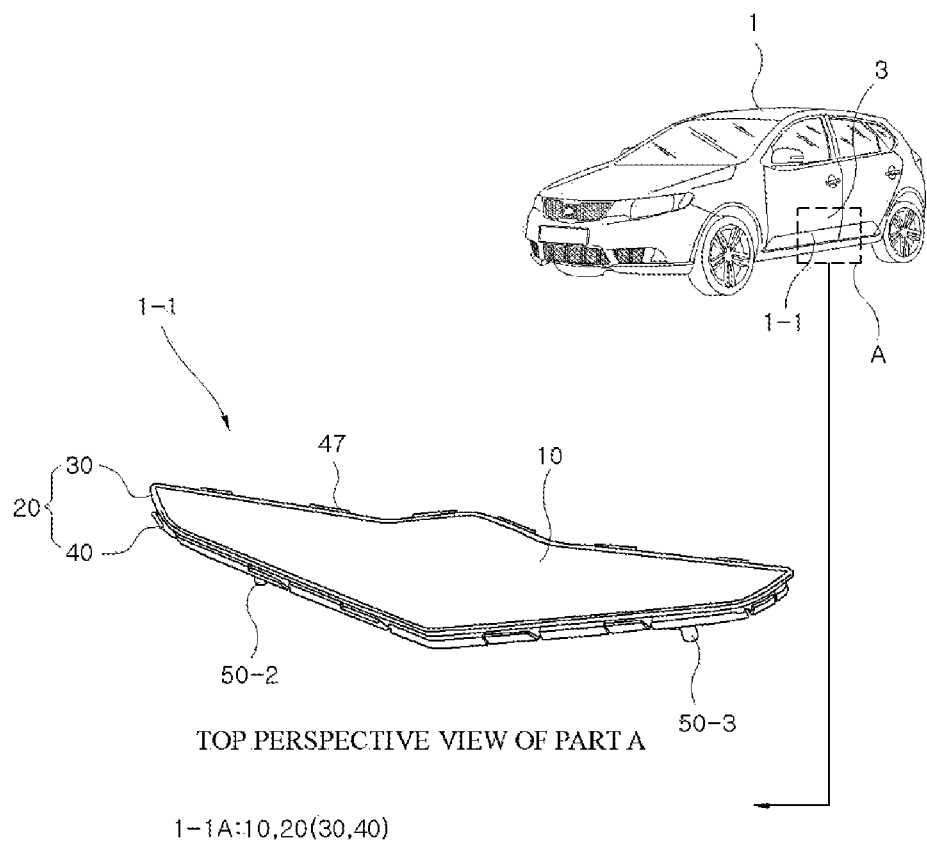
TOP PERSPECTIVE VIEW OF PART A
1-1A:10,20(30,40)
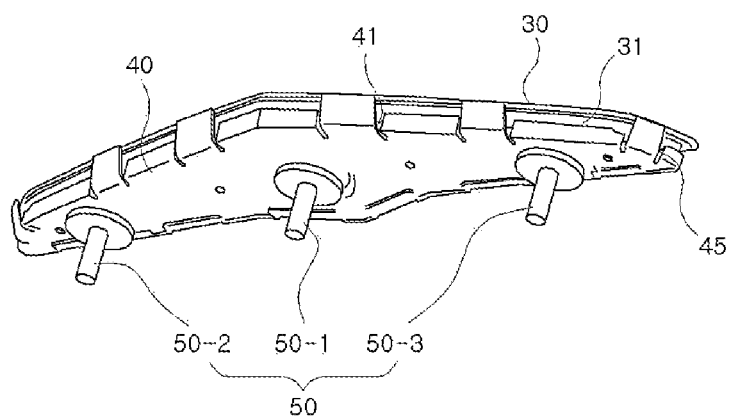
BOTTOM PERSPECTIVE VIEW OF PART A

ENLARGED PERSPECTIVE VIEW OF PART B

CROSS-SECTIONAL VIEW OF PART C IN DIRECTION K

VEHICLE HAVING DISPERSION MANAGEMENT TYPE EXTERIOR DECORATION DEVICE

CROSS-REFERENCE TO RELATED APPLICATION

This application claims priority to and the benefit of Korean Patent Application No. 10-2020-0134272, filed on Oct. 16, 2020, the entire contents of which are incorporated herein by reference.

FIELD

The present disclosure relates to an exterior decoration device.

BACKGROUND

In general, a vehicle is finished with exterior decoration devices positioned and assembled between a plurality of panels, thereby improving design of an external appearance of the vehicle.

For example, garnishes and vehicle logos (or emblems) are used as the exterior decoration devices. In this case, the garnish is configured as a molded product having a comparatively long length and classified into a front garnish, a trunk garnish, a side garnish, a fender garnish, and the like depending on a position at which a decoration attachment part of the vehicle is applied. The vehicle logo (or emblem) is mounted on a front panel, a bonnet, a trunk panel, a trunk door, and the like.

In particular, each of the garnish and the vehicle logo (or emblem) has a mounting clip disposed on a surface opposite to an external surface thereof, and the mounting clip is fitted and inserted into a panel hole to fix the garnish, such that the portion between the panels may be decorated with the external surface of the garnish.

However, in the case of the structure of the garnish using the mounting clip applied to the exterior decoration device, the garnish and the panels are manufactured separately, and then the garnish is assembled between the panels. As a result, a level difference is inevitably formed at a boundary portion where the garnish and the panel meet together.

For example, in a case in which a garnish is directly assembled with an outer panel by a mounting clip, the outer panel is desired to have formability so that the outer panel has a relatively recessed section corresponding to a shape of the garnish, and a surface level difference is formed between the formed section and a straight surface of the garnish. As a result, the garnish does not smoothly match the outer panel, which may lead to a non-uniform external appearance.

As another example, the garnish may be assembled with a dual panel structure including an outer panel and an inner panel so that the garnish is disposed in a space between the outer panel and the inner panel. However, because the garnish depends on dimension dispersion and assembly dispersion of the inner panel assembled by a mounting clip, it is difficult to manage a gap level difference between the garnish and the outer panel, and as a result, the garnish does not smoothly match the outer panel, which may lead to a non-uniform external appearance.

Further, under the design trend of future electric vehicles (e.g., environmentally friendly vehicles such as electric vehicles and hydrogen electric vehicles), a smooth surface of the exterior decoration device such as the garnish and the vehicle logo (or emblem), which does not protrude from the panel in the assembled state, is desirable. However, the exterior decoration device in the related art is fastened to the outer panel or the inner panel by the mounting clip. Therefore, it is structurally difficult to meet the design trend of inhibiting components manufactured separately from protruding and treating the boundary between the two components so that the two components appear to have the same surface.

SUMMARY

The present disclosure provides a vehicle having a dispersion management type exterior decoration device, in which adjustment in a fastening length of a level difference adjustment bolt absorbs dimension dispersion of an inner panel, such that dispersion management is easily performed on the panel, and in particular, an outer panel having an exposed external surface matches a surface of a garnish exposure member to achieve a uniform surface without a surface level difference or a gap level difference between the panels in an assembled state, such that it is possible to implement an external appearance with smooth design suitable for a future electric vehicle.

In one form, the present disclosure provides an exterior decoration device including: a garnish frame including an upper surface to which a garnish exposure member including an exposed external surface is coupled, and including a reaction force hook protruding inclinedly from a rim portion thereof and configured to be elastically deformed; a level difference adjustment bolt configured to define a dispersion adjustment structure in a state of being coupled to the garnish frame, protruding in a direction opposite to the garnish exposure member, and configured to adjust both a surface level difference of the garnish exposure member and a hook level difference of the reaction force hook by inducing a rotation of the dispersion adjustment structure and changing a protrusion length from the garnish frame; and a fastening tool configured to define an excessive torque cut-off structure together with the level difference adjustment bolt, such that torque is transmitted to the level difference adjustment bolt in a state in which the fastening tool is coupled to the excessive torque cut-off structure, and torque is not transmitted to the level difference adjustment bolt in a state in which the fastening tool is released from the excessive torque cut-off structure.

In one form of the present disclosure, the number of reaction force hooks may be more than one, and the number of level difference adjustment bolts may be more than one.

In one form of the present disclosure, the level difference adjustment bolt may include a bolt body having a rotary rod and a circular plate flange that define a "+"-shaped cross-sectional structure, the rotary rod may be coupled to the garnish frame at an upper side of the circular plate flange, and the rotary rod may protrude from the garnish frame at a lower side of the circular plate flange.

In one form of the present disclosure, the rotary rod may have an external thread shaft formed at the upper side of the circular plate flange, and the external thread shaft may be screwed to an internal thread frame hole in the garnish frame and define the dispersion adjustment structure.

In one form of the present disclosure, in the dispersion adjustment structure, the screw engagement may allow a movement direction of the garnish frame and a movement direction of the rotary rod to be opposite to each other when the rotary rod rotates.

In one form of the present disclosure, the rotary rod may have a latch shaft provided at the lower side of the circular plate flange and coupled to a tool head of the fastening tool, and bolt latches formed on a bottom surface of the latch shaft may engage with stepped latch projections formed on a bottom surface of the tool head to define the excessive torque cut-off structure.

In one form of the present disclosure, the bolt latches and the stepped latch projections may be arranged in a circular shape.

In one form of the present disclosure, the excessive torque cut-off structure may transmit the torque in a state in which the bolt latches and the stepped latch projections engage with one another, and the excessive torque cut-off structure may cut off the transmission of torque in a state in which the bolt latches and the stepped latch projections are disengaged.

In one form of the present disclosure, the bolt latch may have a free end section separated from the bottom surface, and the free end section may be separated from the stepped latch projection and define the disengaged state.

In one form of the present disclosure, the free end section may have a wedge tip portion formed by bending an end of the free end section.

In one form of the present disclosure, the garnish frame may include: an upper end frame including the upper surface to which the garnish exposure member is coupled, and a lower end frame configured to be coupled to the level difference adjustment bolt and including the rim portion on which the reaction force hook is provided.

In one form of the present disclosure, the lower end frame may include a coupling flange that defines the rim portion, and the coupling flange may include the reaction force hook provided at a hook forming end which is in contact with an insertion rim of the upper end frame.

In one form of the present disclosure, the reaction force hook may protrude by a height deviating from the coupling flange.

In one form of the present disclosure, the garnish exposure member, the upper end frame, and the lower end frame may be separately molded products, the upper surface of the upper end frame may have a panel seating surface to which the garnish exposure member is coupled, and the upper end frame and the lower end frame may be assembled by means of a screw.

In one form of the present disclosure, the screw may be fastened to a center hub of the upper end frame and a center boss of the lower end frame.

In another form, the present disclosure provides a vehicle including: a decoration attachment part; and an exterior decoration device including: a garnish main body in which an upper end frame including an upper surface to which a garnish exposure member including an exposed external surface is coupled and a lower end frame including an rim portion on which an elastically deformable reaction force hook is provided inclinedly are assembled by a screw, and a level difference adjustment bolt disposed below the garnish main body, including a dispersion adjustment structure fastened to the garnish main body and configured to be rotated by torque applied by an engagement between a fastening tool and an excessive torque cut-off structure, and configured to adjust both a surface level difference of the garnish exposure member and a hook level difference of the reaction force hook by adjusting a length by the rotation, in which the transmission of the torque is cut off by disengagement by hook repulsive force of the reaction force hook.

In one form of the present disclosure, the decoration attachment part may include: an outer panel having the exposed external surface; and an inner panel fastened to the level difference adjustment bolt and recessed with respect to the outer panel so as to receive the garnish main body.

In one form of the present disclosure, dimension dispersion of the outer panel and the inner panel may be absorbed by adjusting the length, the absorption of the dimension dispersion may remove the hook level difference, form hook fixing force by contact between the reaction force hook and the outer panel, remove the surface level difference, and allow the garnish exposure member and the outer panel to be in a surface aligned state.

In one form of the present disclosure, the exterior decoration device may serve as any one of a front garnish, a trunk garnish, a side garnish, and a fender garnish depending on a vehicle application position.

The dispersion management type exterior decoration device applied to the vehicle according to the present disclosure implements the following operations and effects.

First, the garnish or the vehicle logo (or emblem), which is manufactured as a separate component, absorbs the dimension dispersion through the adjustment in the fastening length of the level difference adjustment bolt in the process of assembling the garnish or the vehicle logo (or emblem) with the outer panel, thereby managing the dispersion management. Thus, it is possible reduce a surface level difference and a gap level difference of the outer panel which are caused by a mounting clip structure in the related art. Second, since the fastening length of the level difference adjustment bolt is adjusted by the rotation of the bolt, it is possible to reduce a non-uniform level difference between the panels by simply rotating the bolt after the garnish or the vehicle logo (or emblem) is assembled with the outer panel and the inner panel. Third, since the structure for absorbing excessive torque is applied to the level difference adjustment bolt, the outer panel is not damaged even though the excessive torque is applied in accordance with an operator's working tendency during the process of adjusting the length. Fourth, since the garnish or the vehicle logo (or emblem) and the outer panel match the components without protrusions, there occurs no heterogeneity to the external appearance even though the garnish or the vehicle logo (or emblem) is assembled with the plurality of panels. Fifth, since it is possible to inhibit the exposure of the panel to the external appearance even though the plurality of panels is assembled, it is possible to provide quality in external appearance matching without protrusions, thereby implementing a concept of a future vehicle with smooth design.

DRAWINGS

FIG. 1 is a view illustrating an example of a vehicle to which a dispersion management type exterior decoration device according to one form of the present disclosure is applied;

Figure 6:
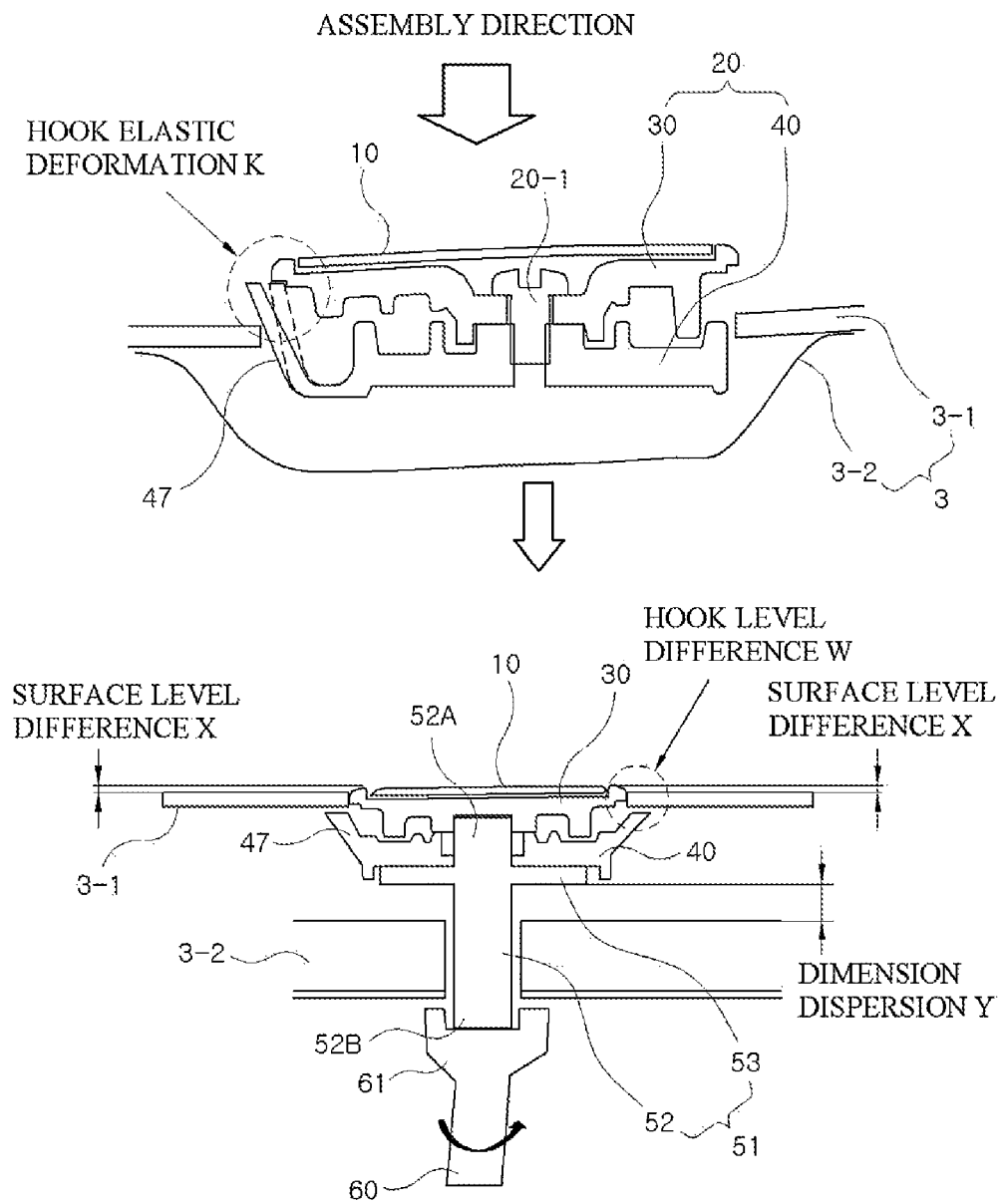
Figure 7:
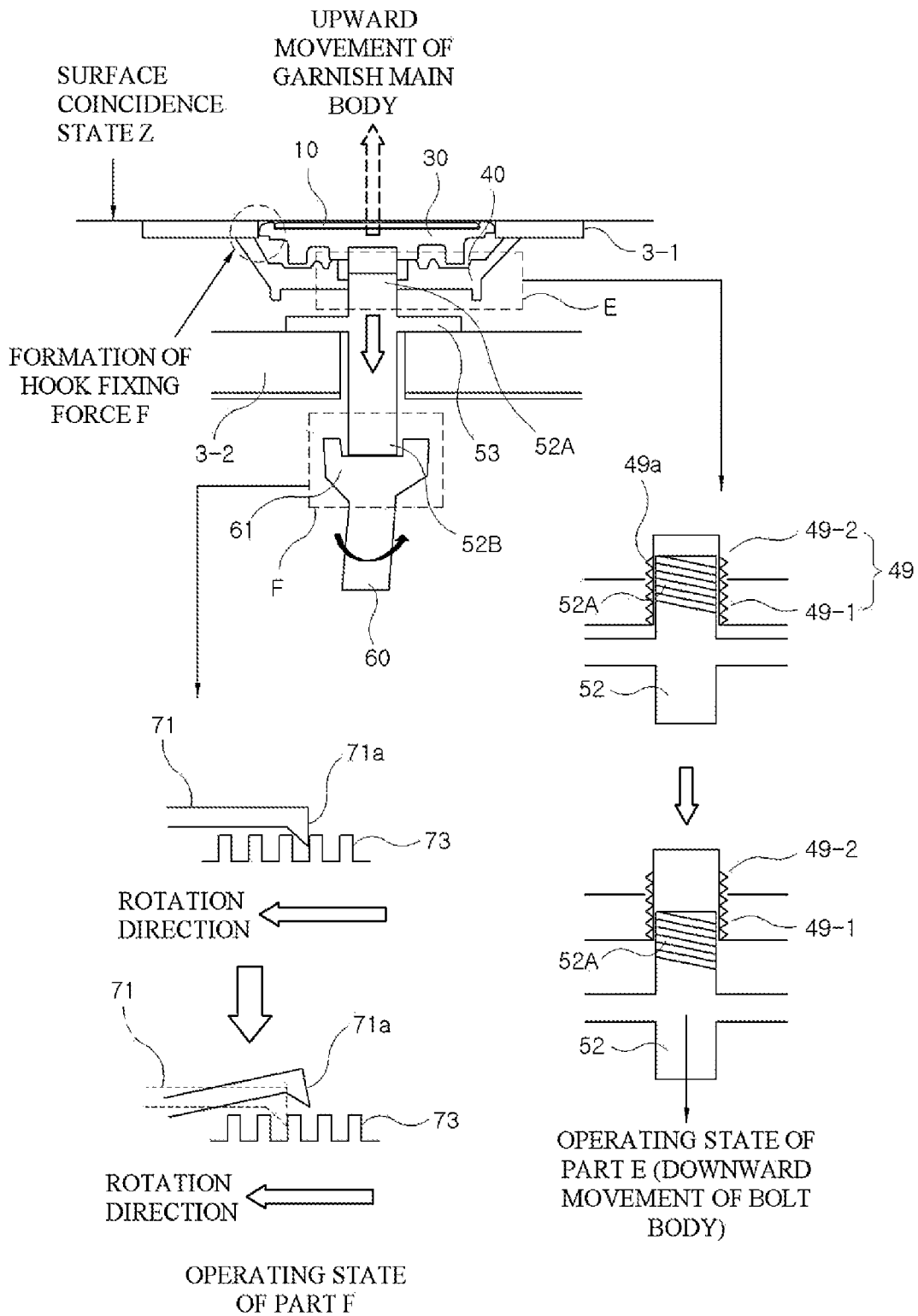

FIG. 6 is a view illustrating an initial state in which the dispersion management type exterior decoration device according to one form of the present disclosure is mounted on a decoration attachment part of a vehicle; and FIG. 7 is a view illustrating a state in which the dispersion management type exterior decoration device according to one form of the present disclosure is mounted on the decoration attachment part of the vehicle and then an assembly process is completed by the level difference adjustment bolt and the excessive torque cut-off structure of the fastening tool regardless of an operator's working tendency.

DETAILED DESCRIPTION

Referring to FIG. 1, a vehicle 1 includes an exterior decoration device 1-1. In particular, the exterior decoration device 1-1 is characterized by being a dispersion management type exterior decoration device 1-1 capable of performing dispersion management on an outer panel 3-1 of a decoration attachment part 3 of the vehicle 1 by applying level difference adjustment bolts 50 (see FIG. 4), thereby implementing smooth external appearance design without a surface level difference between a garnish exposure member 10 and the outer panel 3-1.

Therefore, the dispersion management type exterior decoration device 1-1 is suitable for a future vehicle design concept in which components desirably match one another smoothly without protrusions.

Hereinafter, a garnish, which is the exterior decoration device 1-1 applied to the decoration attachment part 3 of the vehicle 1, will be described as an example, but this description is provided for easily describing components, a structure, and an operation of the exterior decoration device 1-1, and external attachments such as vehicle logos (or emblems) or other objects, which are to be attached to or mounted on an external appearance of the vehicle 1, are of course included in the scope of the present disclosure.

Specifically, the exterior decoration device 1-1 includes a garnish main body 1-1A and the level difference adjustment bolts 50.

For example, the garnish main body 1-1A includes the garnish exposure member 10 and a garnish frame 20. The garnish exposure member 10 is a molded product for decorating the decoration attachment part 3 and has a smooth surface and various shapes. The garnish exposure member 10 is coupled to the garnish frame 20 to define an externally exposed garnish surface. The garnish frame 20 includes an upper end frame 30 and a lower end frame 40 provided as separate molded products, and the upper end frame 30 and the lower end frame 40 are coupled by a screw 20-1 (see FIG. 2) in a state in which an insertion rim 31 of the upper end frame 30 and a coupling flange 41 of the lower end frame 40 are fitted with each other.

In particular, the lower end frame 40 has reaction force hooks 47, and the reaction force hook 47 is a fixing structure with respect to the decoration attachment part 3 in a process (see FIG. 6) of assembling the garnish main body 1-1A with the decoration attachment part 3. The reaction force hook 47 has a tension (i.e., elasticity), such that the reaction force hook 47 is retracted by the tension thereof in an insertion process and then restored to an original position after the insertion by the tension thereof, and as a result, after the complete insertion, the reaction force hook 47 serves to enable the garnish main body 1-1A to be fixed onto the decoration attachment part 3 without being withdrawn therefrom.

For example, the level difference adjustment bolts 50 are integrally assembled with the garnish main body 1-1A and include three level difference adjustment bolts, that is, a set of a first level difference adjustment bolt 50-1, a second level difference adjustment bolt 50-2, and a third level difference adjustment bolt 50-3 in the garnish frame 20.

In particular, the first level difference adjustment bolt 50-1, the second level difference adjustment bolt 50-2, and the third level difference adjustment bolt 50-3 has the same screw fastening structure.

The first level difference adjustment bolt 50-1, the second level difference adjustment bolt 50-2, and the third level difference adjustment bolt 50-3 are disposed to provide uniform fixing force by uniformly distributing fastening force. The first level difference adjustment bolt 50-1 is positioned in a central section of the garnish main body 1-1A, the second level difference adjustment bolt 50-2 is positioned at one side (e.g., a left position in FIG. 1) of the garnish main body 1-1A, and the third level difference adjustment bolt 50-3 is positioned at the other side (e.g., a right position in FIG. 1) of the garnish main body 1-1A.

Figure 2:
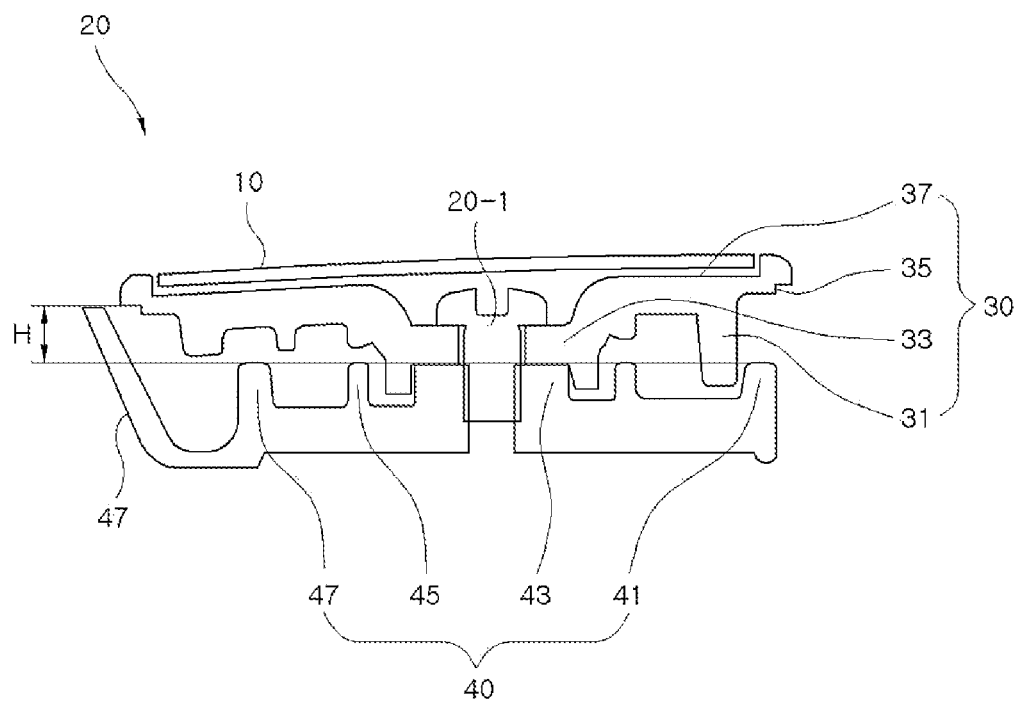
FIG. 2 is a configuration view illustrating a garnish frame assembled with a garnish exposure member having an exposed external surface according to one form of the present disclosure.
Figure 3:
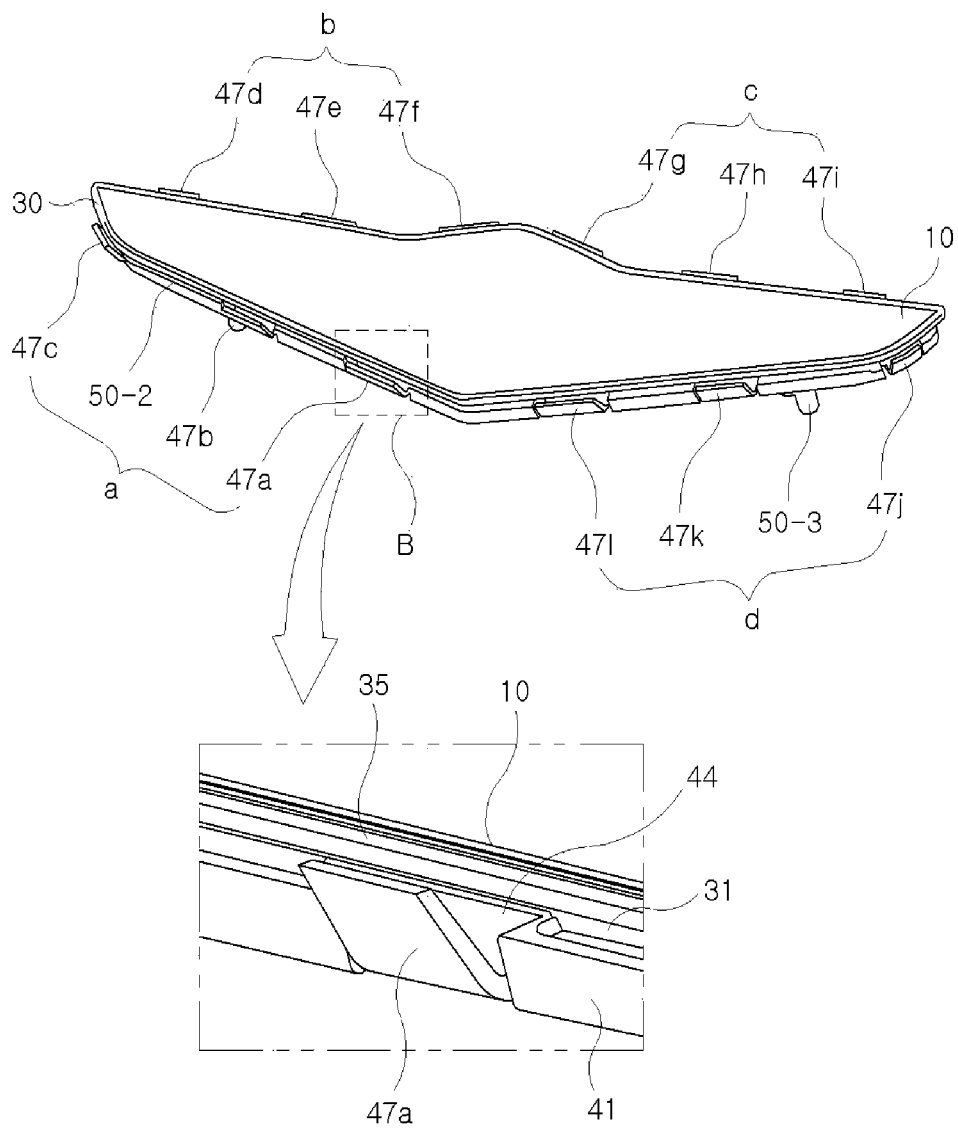
FIG. 3 is a view illustrating an example of a structure and a layout of a catching hook provided on a lower end frame screwed to an upper end frame of the garnish frame according to one form of the present disclosure.

Meanwhile, FIGS. 2 and 3 illustrate the detailed structures of the garnish exposure member 10, the upper end frame 30, and the lower end frame 40 which are components of the garnish main body 1-1A.

Referring to FIG. 2, the upper end frame 30 is coupled to the lower end frame 40 in a state in which the garnish exposure member 10 is positioned on an upper surface of the upper end frame 30, thereby define a single assembly.

Specifically, the upper end frame 30 is configured as an upper end frame body manufactured as an injection-molded product, and the upper end frame body includes the insertion rim 31, a center hub 33, a stepped hook projection 35, and a panel seating surface 37.

For example, the insertion rim 31 protrudes by a predetermined height from a lower surface of the upper end frame body and is formed at a position at which a portion of the upper end frame body is recessed inward. The center hub 33 is disposed in the central section in which width and length directions of the upper end frame body intersect each other, and the center hub 33 protrudes by a predetermined height while having a level difference with respect to the panel seating surface 37. The stepped hook projection 35 is spaced apart from the insertion rim 31 on the lower surface of the upper end frame body and has a stepped cross-sectional structure disposed at an end of the upper end frame body. The panel seating surface 37 is formed on an upper surface of the upper end frame body and has a depth equal to a thickness of the garnish exposure member 10.

In particular, the center hub 33 protrudes by the same height as the insertion rim 31, and an internal thread hole to which the screw 20-1 is fastened is formed at a center of the center hub 33. The stepped hook projection 35 has the stepped cross-sectional structure and limits a position to which the reaction force hook 47 of the lower end frame 40 is pushed by hook elastic deformation (K) (see FIG. 6). The panel seating surface 37 is connected to the garnish exposure member 10 by interference fit to fix the garnish exposure member 10.

Specifically, the lower end frame 40 is configured as a lower end frame body manufactured as an injection-molded product, and the lower end frame body includes the coupling flange 41, a center boss 43, hook forming ends 44, a rib 45, and the reaction force hooks 47.

For example, the coupling flange 41 protrudes by a predetermined height from an upper surface of the upper end frame body. The center boss 43 is disposed in a central section in which width and length directions of the lower end frame body intersect each other, and the center boss 43 protrudes by a predetermined height. The hook forming end 44 is formed by depressing a partial section of the coupling flange 41 inward. The rib 45 protrudes by a predetermined height between the coupling flange 41 and the center boss 43. The reaction force hook 47 is spaced apart from the hook forming end 44 at an acute angle and formed integrally with the hook forming end 44 while having tension (i.e., elasticity).

In particular, the coupling flange 41 is sized such that the insertion rim 31 of the upper end frame 30 is inserted into a space formed inside the coupling flange 41. An internal thread hole to which the screw 20-1 is fastened is formed at a center of the center boss 43. The center boss 43 protrudes by the same height as the coupling flange 41, and the internal thread hole to which the screw 20-1 is fastened is formed at a center of the center boss 43. The center boss 43 is fitted with a flange seating surface formed, at a predetermined depth, in a lower surface of the center hub 33 of the upper end frame 30, such that the internal thread hole of the center boss 43 may be easily aligned with the internal thread hole of the center hub 33. The rib 45 enhances rigidity of the upper end frame body.

In addition, the reaction force hook 47 has a panel contact height H higher than a height of the coupling flange 41, and the panel contact height H allows the reaction force hook 47 to come into contact with the stepped hook projection 35 of the upper end frame 30 when the reaction force hook 47 is folded (i.e., elastically deformed), and allows the reaction force hook 47 to come into contact with the outer panel 3-1 (see FIG. 6) of the decoration attachment part 3 when the reaction force hook 47 is unfolded (i.e., returned to an initial position) so that the position of the reaction force hook 47 is restricted.

Referring to FIG. 3, the lower end frame 40 has the hook forming ends 44 formed on the coupling flange 41 and spaced apart from one another at predetermined intervals, and the reaction force hooks 47 are equal in number to the hook forming ends 44. In this case, the hook forming end 44 generates contact fixing force by being in close contact with the insertion rim 31 of the upper end frame 30 and maintains the assembled state of the upper end frame 30 and the lower end frame 40, together with screw fastening force (see FIG. 2) of the screw 20-1.

Specifically, the reaction force hooks 47 include twelve reaction force hooks 47, that is, a set of first to twelfth hooks 47a, 47b, 47c, 47d, 47e, 47f, 47g, 47h, 47i, 47j, 47k, and 47l.

For example, assuming that the entire periphery of the coupling flange 41 is divided into a section a, a section b, a section c, and a section d, the three hook forming ends 44 are provided in each of the sections a, b, c, and d.

Therefore, the first hook 47a, the second hook 47b, and the third hook 47c are assigned to one set and formed at the hook forming ends 44 in the section a, the fourth hook 47d, the fifth hook 47e, and the sixth hook 47f are assigned to one set and formed at the hook forming ends 44 in the section b, the seventh hook 47g, the eighth hook 47h, and the ninth hook 47i are assigned to one set and formed at the hook forming ends 44 in the section c, and the tenth hook 47j, the eleventh hook 47k, and the twelfth hook 47l are assigned to one set and formed at the hook forming ends 44 in the section d.

As described above, in a manner such that the three hooks are assigned to one set, the first to twelfth hooks 47a, 47b, 47c, 47d, 47e, 47f, 47g, 47h, 47i, 47j, 47k, and 47l are in contact with the outer panel 3-1 (see FIG. 6) of the decoration attachment part 3 in the section a, the section b, the section c, and the section d of the coupling flange 41, such that the position of the garnish main body 1-1A is uniformly restricted. In this case, the position restriction state of the first to twelfth hooks 47a, 47b, 47c, 47d, 47e, 47f, 47g, 47h, 47i, 47j, 47k, and 47l transmits repulsive force to the level difference adjustment bolts 50 when the level difference adjustment bolts 50 are rotated.

In particular, more than 12 catching hooks 47 may be used for a mounting part whose position restriction state is desired to be more strengthened, whereas less than 12 catching hooks 47 may be used for a mounting part whose position restriction state is desired to be more weakened.

Figure 4:
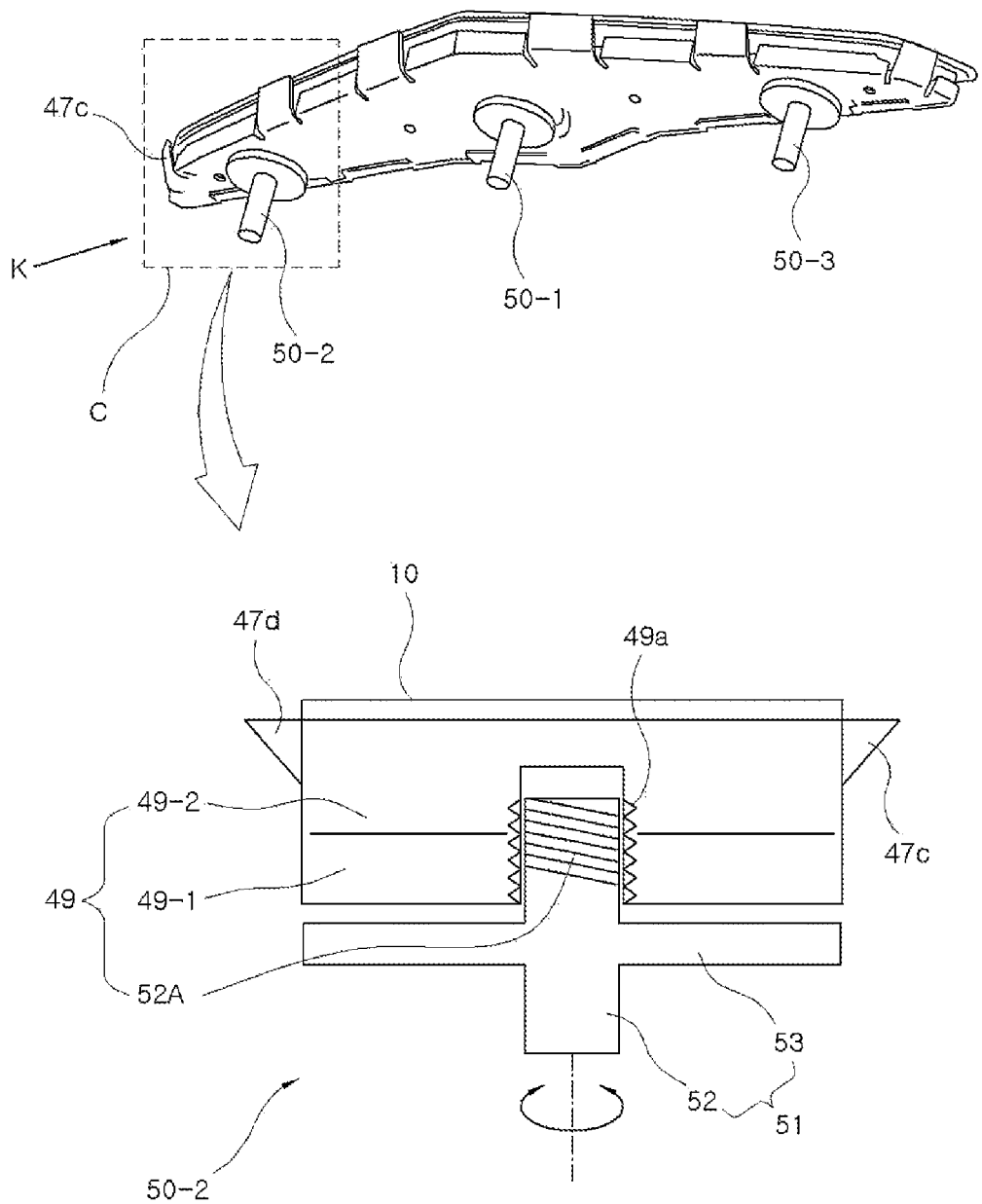
FIG. 4 is a configuration view illustrating a level difference adjustment bolt that absorbs dispersion between components by adjusting a fastening length with respect to the garnish frame according to one form of the present disclosure.
Figure 5:
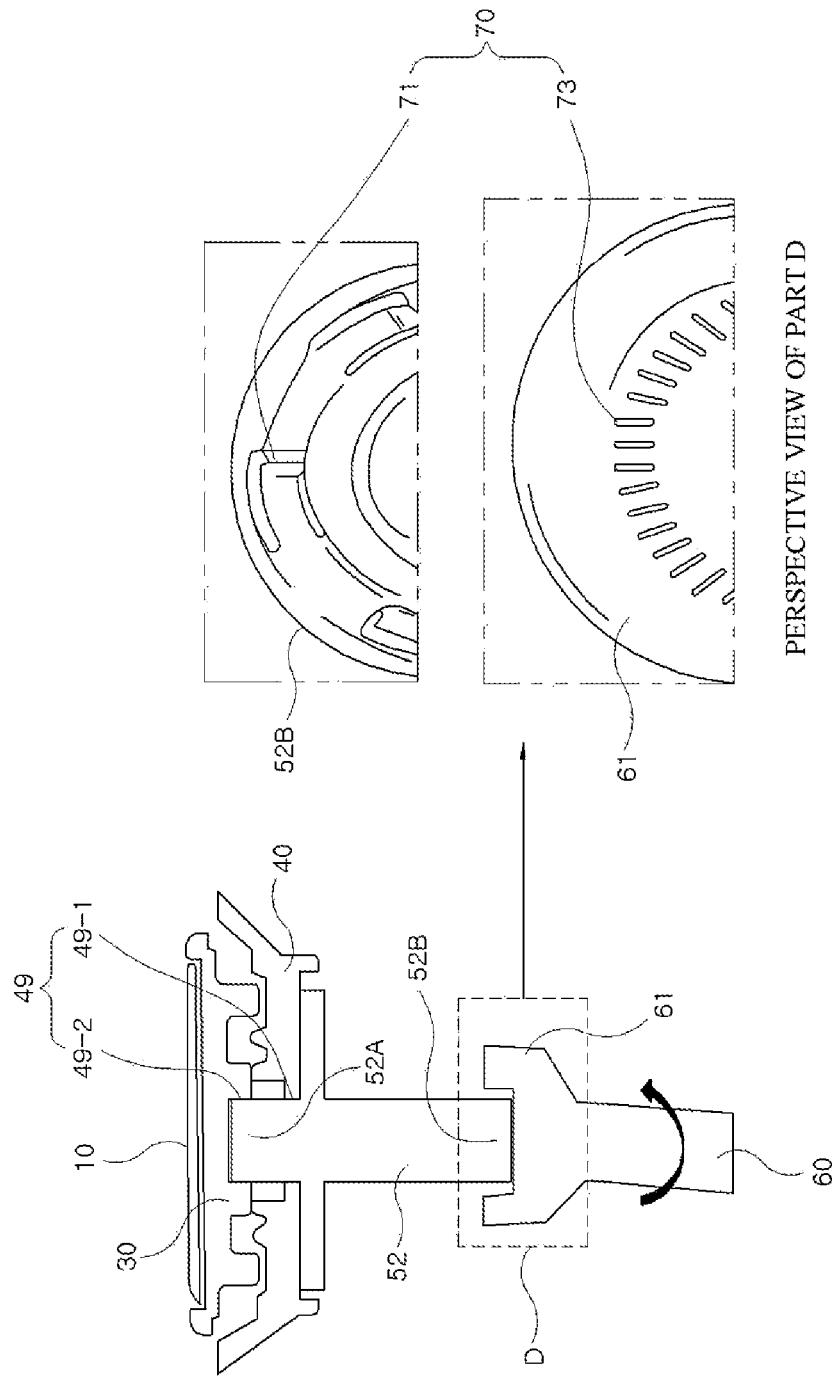
FIG. 5 is a view illustrating an example of an excessive torque cut-off structure applied to a fastening tool for rotating the level difference adjustment bolt according to one form of the present disclosure.

Meanwhile, FIGS. 4 and 5 illustrate a detailed configuration of the level difference adjustment bolt 50 and a fastening tool 60 having a structure suitable for the level difference adjustment bolt 50. In this case, the level difference adjustment bolts 50 include the first, second, and third level difference adjustment bolts 50-1, 50-2, and 50-3, but because the first, second, and third level difference adjustment bolts 50-1, 50-2, and 50-3 are configured by the same component, the level difference adjustment bolt 50 will be described.

Referring to FIG. 4, the level difference adjustment bolt 50 includes a bolt body 51, and the bolt body 51 has a rotary rod 52 and a circular plate flange 53.

For example, the rotary rod 52 has a straight shape having a predetermined length, and an external thread shaft 52A is formed at one side of the rotary rod 52. The circular plate flange 53 has a circular shape having a predetermined thickness, and the rotary rod 52 protrudes from upper and lower surfaces of the circular plate flange 53 and disposed at a center of the circular plate flange 53.

Therefore, the bolt body 51 defines a "+"-shaped cross-sectional structure by the rotary rod 52 and the circular plate flange 53.

Further, the level difference adjustment bolt 50 and the garnish frame 20 constitute a dispersion adjustment structure 49, and the dispersion adjustment structure 49 is defined by combining an internal thread frame hole 49a of the garnish frame 20 and the external thread shaft 52A of the level difference adjustment bolt 50.

For example, the internal thread frame hole 49a includes an upper end screw hole 49-1 formed in the upper end frame 30 which is the component of the garnish frame 20, and a lower end screw hole 49-2 formed in the lower end frame 40 which is the component of the garnish frame 20.

For example, the external thread shaft 52A extends from the lower end screw hole 49-2 to the upper end screw hole 49-1, and a screw section length is shorter than a screw hole depth of each of the lower end screw hole 49-2 and the upper end screw hole 49-1.

Therefore, the external thread shaft 52A is extended from the upper end screw hole 49-1 or retracted into the upper end screw hole 49-1 in a rotation direction of the bolt body 51, such that the level difference adjustment bolt 50 adjusts a screw fastening length through the dispersion adjustment structure 49.

Referring to FIG. 5, the fastening tool 60 applies rotational force to the level difference adjustment bolt 50 so that the level difference adjustment bolt 50 adjusts the screw fastening length with respect to the garnish main body 1-1A.

For example, the fastening tool 60 has a tool head 61 formed at an end of a gripping part used as a handle, and the tool head 61 is coupled to a latch shaft 52B formed on the opposite portion (i.e., an axial section opposite to the external thread shaft 52A) of the rotary rod 52 forming the bolt body 51 of the level difference adjustment bolt 50.

Therefore, the tool head 61 is coupled to the latch shaft 52B of the bolt body 51 in the state in which the garnish main body 1-1A is assembled with the decoration attachment part 3, and the fastening tool 60 applies torque to the bolt body 51, such that the rotational force is applied to the bolt body 51.

Therefore, the bolt body 51 absorbs the dimension dispersion or the assembly dispersion by adjusting the screw fastening length with the dispersion adjustment structure 49 by applying torque by the fastening tool 60, such that it is possible to remove a surface level difference or a gap level difference of the garnish exposure member 10 in the state in which the garnish main body 1-1A is assembled with the decoration attachment part 3.

Further, the level difference adjustment bolt 50 and the fastening tool 60 form an excessive torque cut-off structure 70.

Specifically, the excessive torque cut-off structure 70 is defined by combining bolt latches 71 formed on the bolt body 51 of the level difference adjustment bolt 50, and stepped latch projections 73 formed on the tool head 61 of the fastening tool 60.

For example, the bolt latch 71 is formed to structurally have tension (i.e., elasticity) by forming a circular rim on a bottom surface of the latch shaft 52B of the rotary rod 52 of the bolt body 51, dividing the circular rim into rim sections formed at predetermined intervals, and forming, in each rim section, a free end section separated from the bottom surface and having a protruding structure.

For example, the stepped latch projections 73 are formed by forming, in the bottom surface of the tool head 61, a circular groove having a size coincident with the circular rim, and forming protrusions at predetermined intervals in the circular groove, so that the end of the free end section of the bolt latch 71 is inserted into a stepped projection space between the protrusions.

Therefore, when the level difference adjustment bolt 50 receives the hook repulsive force from the reaction force hook 47 in the position restriction state of the reaction force hook 47, the excessive torque cut-off structure 70 generates 'snapping' contact sound by the hook repulsive force between the ends of the free end sections of the bolt latches 71 and the stepped latch projections 73, such that the operator may recognize the completion of the assembly.

In particular, the bolt latch 71 has a wedge tip portion 71a (see FIG. 7) formed at the end of the free end section, and the wedge tip portion 71a makes it easy for the stepped latch projection 73 to be inserted into the stepped projection space between the protrusions.

Meanwhile, FIGS. 6 and 7 illustrate an assembly process of mounting the exterior decoration device 1-1 in the vehicle 1. In this case, in the vehicle 1, the exterior decoration device 1-1 is applied not only to a portion where the garnish is assembled, but also to a portion where the vehicle logo (or emblem) is assembled and to portions where other external attachments are assembled. There will be described as an example the configuration in which the exterior decoration device 1-1 is assembled by using the decoration attachment part 3 in the vehicle 1 and the decoration attachment part 3 includes the outer panel 3-1 and an inner panel 3-2 disposed at an interval from the outer panel 3-1.

Referring to FIG. 6, the exterior decoration device 1-1 includes the garnish main body 1-1A and the level difference adjustment bolts 50. In this case, the garnish main body 1-1A is assembled as the upper end frame 30, which has the panel seating surface 37 on which the garnish exposure member 10 is assembled, is coupled to the lower end frame 40 by means of the screw 20-1 screwed to the center hub 33 and the center boss 43. Further, the level difference adjustment bolt 50 is assembled as the external thread shaft 52A of the rotary rod 52 of the bolt body 51 is screwed to the internal thread frame hole 49a of the upper end frame 30 and the lower end frame 40.

First, the garnish main body 1-1A is put into a garnish main body mounting space formed by depressing the inner panel 3-2 with respect to an opening portion of the outer panel 3-1.

Next, in a process in which the garnish main body 1-1A is pushed and inserted into the garnish main body mounting space, the reaction force hook 47 of the lower end frame 40 comes into contact with the outer panel 3-1, and the reaction force hook 47 is pushed toward the stepped hook projection 35 of the upper end frame 30 by being continuously pushed by hook elastic deformation K made by tension (i.e., elasticity), such that the garnish main body 1-1A is completely inserted into the garnish main body mounting space.

Then, after the garnish main body 1-1A is completely inserted, the reaction force hook 47 is separated from the outer panel 3-1 and returned to the initial state.

In particular, the garnish main body 1-1A completely inserted into the garnish main body mounting space may have a hook level difference W and a surface level difference X due to the lower end frame 40 and the inner panel 3-2 (or the outer panel 3-1 and the inner panel 3-2) having dimension dispersion Y.

For example, the hook level difference W is formed when the reaction force hook 47 is not in contact with or (simply in contact with) the bottom surface of the outer panel 3-1 such that the reaction force hook 47 may not form enough contact force with the outer panel 3-1 to generate hook fixing force F (see FIG. 7). Further, the surface level difference X is formed because the garnish exposure member 10 protrudes, and the surface level difference X causes the outer panel 3-1 not to have a smooth surface.

Therefore, the level difference adjustment bolt 50 is coupled to the fastening tool 60, and the tool head 61 of the fastening tool 60 applies torque to the latch shaft 52B of the rotary rod 52 of the bolt body 51, such that the dispersion adjustment assembly process is performed by the rotation of the level difference adjustment bolt 50.

Referring to FIG. 7, the dispersion adjustment structure 49 and the excessive torque cut-off structure 70 operate as the level difference adjustment bolt 50 is rotated by the torque from the fastening tool 60.

For example, in the dispersion adjustment structure 49, when the rotary rod 52 of the bolt body 51 is rotated by torque from the fastening tool 60, the rotation of the rotary rod 52 allows the external thread shaft 52A to be extended from the upper end screw hole 49-1 of the upper end frame 30, and the bolt body 51 is moved downward so that the circular plate flange 53 of the bolt body 51 comes into contact with the upper surface of the inner panel 3-2.

At the same time, the downward movement of the bolt body 51 pushes the garnish main body 1-1A upward toward the outer panel 3-1, and the upward movement of the garnish main body 1-1A brings the reaction force hook 47 into close contact with the outer panel 3-1 to enhance the contact state, such that a surface aligned state Z is formed together with the hook fixing force F.

As described above, in the process of assembling the garnish main body 1-1A, the dispersion adjustment structure 49 absorbs the dimension dispersion Y of the garnish main body 1-1A by adjusting the screw fastening length with respect to the level difference adjustment bolt 50, such that the fixed state of the garnish main body 1-1A may be maintained by the hook fixing force F and the smooth surface may be achieved by removing the surface level difference X with the surface aligned state Z.

Next, the hook fixing force F induces the hook repulsive force to operate the excessive torque cut-off structure 70.

For example, the torque, which is consistently applied to the level difference adjustment bolt 50 by the fastening tool 60, applies the hook repulsive force, which is higher than the hook fixing force F, to the reaction force hook 47, and the hook repulsive force operates to allow the wedge tip portion 71a of the bolt latch 71 formed on the latch shaft 71 of the bolt body 51 to be inserted into the stepped projection space between the protrusions constituting the stepped latch projections 73 of the tool head 61.

That is, in the state in which the bolt latch 71 and the stepped latch projection 73 are in contact with each other through the wedge tip portion 71a, the torque from the fastening tool 60 acts as restrictive force for rotating the bolt body 51 until the hook fixing force F is formed. However, after the hook fixing force F is formed, the hook repulsive force, which is generated as the torque is consistently applied, is transmitted to the bolt body 51.

As a result, the hook repulsive force serves to allow the wedge tip portion 71a of the bolt latch 71 to be withdrawn from the stepped latch projection 73 by the tension (i.e., elasticity) of the bolt latch 71, and the separation between the bolt latch 71 and the stepped latch projection 73 allows the bolt body 51 to freely rotate in the situation in which the torque is transmitted from the fastening tool 60.

As described above, the free rotation of the bolt body 51 relative to the torque from the fastening tool 60 generates the 'snapping' sound which is contact noise generated as the contact and the separation between the wedge tip portion 71a of the bolt latch 71 and the stepped latch projection 73 are repeatedly performed. The 'snapping' sound notifies the operator of the completion of the assembly and allows the operator to recognize that the garnish main body 1-1A is completely mounted, thereby enabling the operator to stop the rotation of the fastening tool 60.

Therefore, as described above with reference to FIGS. 6 and 7, the dispersion management type exterior decoration device 1-1 allows the garnish or the vehicle logo (or emblem), which is the component to be inserted between the plurality of panels, to absorb the dimension dispersion of the peripheral components, such that the garnish or the vehicle logo (or emblem) may match the peripheral components to achieve a uniform surface. In particular, even though there occurs a non-uniform level difference from the peripheral components after the assembly process or the assembly is completed, the excessive torque, which may be generated in accordance with the operator's working tendency, is mitigated by the level difference adjustment bolt 51 (see FIG. 4), such that it is possible to provide quality in external appearance matching without damage to the outer panel during the assembly.

As described above, the dispersion management type exterior decoration device 1-1 applied to the vehicle 1 according to one form of the present disclosure includes: the garnish main body 1-1A formed by assembling, by the screw 20-1, the upper end frame 30 having the upper surface to which the garnish exposure member 10 having the exposed external surface is coupled, and the lower end frame 40 having the reaction force hook 47; and the level difference adjustment bolt 50 configured to adjust both the surface level difference X of the garnish exposure member 10 and the hook level difference W of the reaction force hook 47 by adjusting a protruding length of the garnish main body 1-1A by the rotation of the dispersion adjustment structure 49 made by the engagement between the fastening tool 60 and the excessive torque cut-off structure 70, and to cut off the transmission of the torque by the disengagement by the hook repulsive force of the reaction force hook 47.

Therefore, when the dispersion management type exterior decoration device 1-1 is assembled with the decoration attachment part 3 of the vehicle 1, the level difference adjustment bolt 50 adjusts both the surface level difference X of the garnish exposure member 10 having the exposed external surface and the hook level difference W of the reaction force hook 47 by the rotation of the dispersion adjustment structure 49 made by the engagement between the fastening tool 60 and the excessive torque cut-off structure 70, and the level difference adjustment bolt 50 cannot receive the torque due to the disengagement by the hook repulsive force of the reaction force hook 47, such that the adjustment in the fastening length of the level difference adjustment bolt 50 absorbs the dimension dispersion of the inner panel 3-2, and as a result, the dispersion management may be easily performed on the panel. In particular, the outer panel 3-1 having the exposed external surface matches the surface of the garnish exposure member 10 to achieve a uniform surface without a surface level difference or a gap level difference between the panels in the assembled state, and as a result, it is possible to implement an external appearance with smooth design.

What is claimed is:

1. An exterior decoration device comprising:
    a garnish frame including:
        an upper surface to which a garnish exposure member including an exposed external surface is coupled, and
        a reaction force hook protruding inclinedly from a rim portion of the garnish frame and configured to be elastically deformed;
    a level difference adjustment bolt including an external thread shaft and configured to form a dispersion adjustment structure in a state of being coupled to the garnish frame, protruding in a direction opposite to the garnish exposure member, the level difference adjustment bolt configured to adjust both a surface level difference of the garnish exposure member and a hook level difference of the reaction force hook by inducing a rotation of the dispersion adjustment structure and changing a protrusion length of the external thread shaft protruding from the garnish frame, wherein the surface level difference is a gap in level between a surface of an outer panel and the garnish exposure member, and the hook level difference is a gap between a bottom surface of the outer panel and the reaction force hook; and
    a fastening tool configured to define an excessive torque cut-off structure together with the level difference adjustment bolt,
    wherein a torque is transmitted to the level difference adjustment bolt in a state in which the fastening tool is coupled to the excessive torque cut-off structure, and the torque is not transmitted to the level difference adjustment bolt in a state in which the fastening tool is released from the excessive torque cut-off structure.

2. The exterior decoration device of claim 1, further comprising a plurality of reaction force hooks.

3. The exterior decoration device of claim 1, wherein:
the level difference adjustment bolt comprises a bolt body including a rotary rod and a circular plate flange that define a "+"-shaped cross-sectional structure, and
the rotary rod is coupled to the garnish frame at an upper side of the circular plate flange and protrudes from the garnish frame at a lower side of the circular plate flange.

4. The exterior decoration device of claim 3, wherein the rotary rod includes the external thread shaft formed at the upper side of the circular plate flange, and
the external thread shaft is screwed to an internal thread frame hole in the garnish frame to form the dispersion adjustment structure.

5. The exterior decoration device of claim 4, wherein the screw engagement in the dispersion adjustment structure allows a movement direction of the garnish frame and a movement direction of the rotary rod to be opposite to each other when the rotary rod rotates.

6. The exterior decoration device of claim 3, wherein the rotary rod includes a latch shaft provided at the lower side of the circular plate flange and coupled to a tool head of the fastening tool, and
bolt latches formed on a bottom surface of the latch shaft engage with stepped latch projections formed on a bottom surface of the tool head and define the excessive torque cut-off structure.

7. The exterior decoration device of claim 6, wherein the bolt latches and the stepped latch projections are arranged in a circular shape.

8. The exterior decoration device of claim 6, wherein the excessive torque cut-off structure is configured to transmit the torque in a state in which the bolt latches and the stepped latch projections are engaged with one another and to cut off the transmission of the torque in a state in which the bolt latches and the stepped latch projections are disengaged.

9. The exterior decoration device of claim 8, wherein each bolt latch includes a free end section separated from the bottom surface, and
the free end section is separated from the stepped latch projection and define the disengaged state.

10. The exterior decoration device of claim 9, wherein the free end section includes a wedge tip portion formed by bending an end of the free end section.

11. The exterior decoration device of claim 3, further comprising a plurality of level difference adjustment bolts.

12. The exterior decoration device of claim 1, wherein the garnish frame comprises:
an upper end frame including the upper surface to which the garnish exposure member is coupled, and
a lower end frame configured to be coupled to the level difference adjustment bolt and including the rim portion on which the reaction force hook is provided.

13. The exterior decoration device of claim 12, wherein the lower end frame includes a coupling flange that defines the rim portion, and
the coupling flange includes the reaction force hook provided at a hook forming end that is in contact with an insertion rim of the upper end frame.

14. The exterior decoration device of claim 13, wherein the reaction force hook protrudes by a height deviating from the coupling flange.

15. The exterior decoration device of claim 12, wherein the garnish exposure member, the upper end frame, and the lower end frame are separately molded,
the upper surface of the upper end frame includes a panel seating surface to which the garnish exposure member is coupled, and
the upper end frame and the lower end frame are assembled by a screw.

16. The exterior decoration device of claim 15, wherein the screw is fastened to a center hub of the upper end frame and a center boss of the lower end frame.

17. A vehicle comprising:
a decoration attachment part including an outer panel; and
an exterior decoration device configured to be assembled with the decoration attachment part, the exterior decoration device including:
a garnish main body comprising:
a garnish exposure member including an exposed external surface,
an upper end frame including an upper surface to which the garnish exposure member is coupled, and
a lower end frame including a rim portion on which an elastically deformable reaction force hook is provided inclinedly, wherein the upper end frame and the lower end frame are assembled by a screw; and
a level difference adjustment bolt disposed below the garnish main body, including an external thread shaft and a dispersion adjustment structure fastened to the garnish main body, configured to be rotated by torque applied by an engagement between a fastening tool and an excessive torque cut-off structure, and configured to adjust both a surface level difference of the garnish exposure member and a hook level difference of the reaction force hook by adjusting a protruding length of the external thread shaft from a garnish frame by the rotation, wherein the transmission of the torque is cut off by disengagement by hook repulsive force of the reaction force hook, and
wherein the surface level difference is a gap in level between the exposed external surface of the outer panel and the garnish exposure member, and the hook level difference is a gap between a bottom surface of the outer panel and the reaction force hook.

18. The vehicle of claim 17, wherein the decoration attachment part comprises:
an inner panel fastened to the level difference adjustment bolt, recessed with respect to the outer panel, and configured to receive the garnish main body.

19. The vehicle of claim 18, wherein: dimension dispersion of the outer panel and the inner panel is absorbed by adjusting the protruding length, and
the absorption of the dimension dispersion removes the hook level difference, form hook fixing force by a contact between the reaction force hook and the outer panel, removes the surface level difference, and allows the garnish exposure member and the outer panel to be in a surface aligned state.

20. The vehicle of claim 18, wherein the exterior decoration device is configured to be any one of a front garnish, a trunk garnish, a side garnish, and a fender garnish depending on a vehicle application position.

* * * * *